No. 796,368. PATENTED AUG. 1, 1905.
C. P. STEINMETZ.
MOTOR METER.
APPLICATION FILED NOV. 21, 1896.
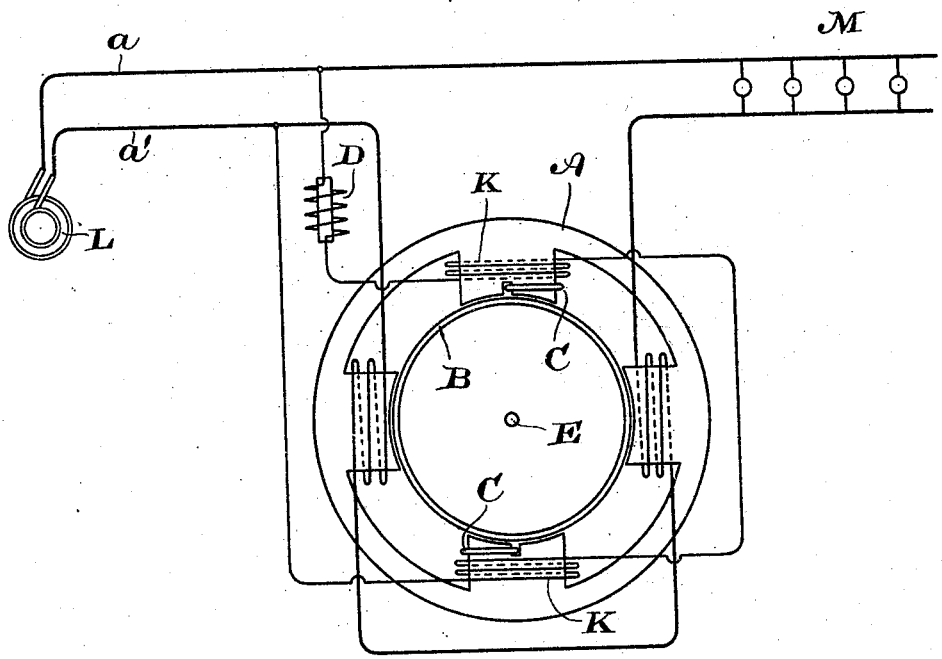
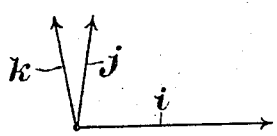
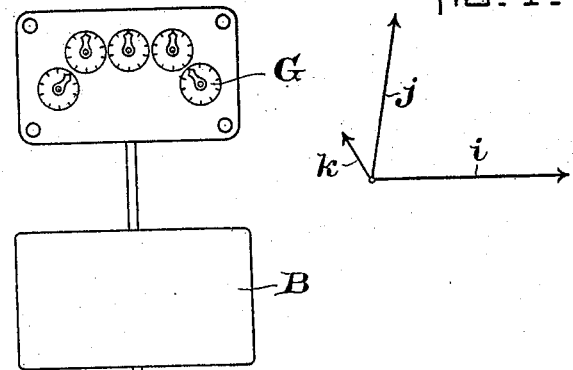
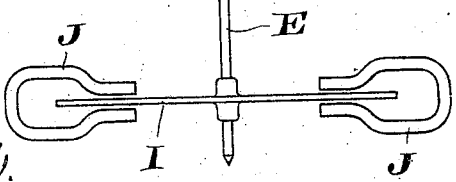

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

MOTOR-METER.

No. 796,368.                Specification of Letters Patent.                Patented Aug. 1, 1905.

Application filed November 21, 1896. Serial No. 612,943.

*To all whom it may concern:*

Be it known that I, CHARLES P. STEINMETZ, a citizen of the United States, residing at Schenectady, in the county of Schenectady, State of New York, have invented certain new and useful Improvements in Motor-Meters, of which the following is a specification.

My invention relates to methods of and apparatus for measuring the energy consumed in an alternating-current system or any portion thereof, and has for its object to provide a meter which will start on light load and register with a high degree of accuracy at all loads whether inductive or non-inductive in their nature. In order that the meter-readings may correspond to the actual energy supplied to and consumed in the metered circuit or branch circuit at all loads and at all lags, wattmeters have heretofore been designed in which the armature is acted upon by two fluxes dephased from each other by ninety degrees when the power factor of the circuit is unity and changing their phase-angle as the power factor drops. All such meters, so far as I am aware, are quarterphase meters, wherein there are maintained only two primary fluxes differing in phase by ninety degrees and acting inductively upon the armature at two points. As it is impossible to produce a phase difference equaling ninety degrees by using simply current and potential coils with high self-induction in the potential-circuit, a great deal of ingenuity has been expended in devising various ways by which the current and potential-fluxes may be dephased by the required amount. For example, it has been proposed to advance the current in the current-coil of the meter by shunting it with an inductive resistance or to lag the current in the potential-coil by shunting it with a non-inductive resistance or to lag the magnetism in the shunt-core by winding on it a third coil, so that the shunt-flux is the resultant of the two out-of-phase magnetizing-currents. In all cases, however, the effort has been to secure two fluxes in exact quadrature with which to act inductively on the armature.

I have found that an equally accurate meter can be made by using not two fluxes in quadrature, but a greater number, preferably three, all dephased from each other and all acting inductively upon the armature at as many different points. Hence while in the existing forms of meters for inductive circuits there are only two fluxes, both of which must be excited to produce torque, in my meter there are at least three fluxes, any two or all three of which will create torque. The main current and potential fluxes in my meter will usually differ by a phase-angle of somewhat less than ninety degrees—for example, such an angle as can be readily obtained by a current-coil and a potential-coil of high self-induction without the corrective expedients recently devised for inductive load-meters—and the third flux lends a starting torque sufficient to balance friction at no load, thereby doing the work of a special starting-coil and also slows down the meter when the lag increases in the circuit, so as to maintain the registration proportional to the true energy consumed in the circuit.

In carrying out this invention as applied, for example, to a single-phase wattmeter I prefer to provide a multipolar field-magnet having on some of its poles windings in series with the mains and on other poles windings in shunt with the mains. The shunt or potential windings are preferably designed for a low resistance and high self-induction, and I prefer to place a reactive coil in series with them in order that the lag of the current in these coils may be as high as possible. This lag can never, however, reach ninety degrees. The poles on which these potential-coils are wound may be divided into two parts and a short-circuited potential-coil or copper ring or a coil shunted across the other potential-coil, but of different reactance, is mounted on one of the parts. The armature or revolving member should be composed of aluminium or some other material of good conductivity.

Although this invention is described and illustrated as an electric meter and my improvements are particularly adapted thereto and valuable therewith, yet it is within the scope of some of my claims to operate an alternating-current motor in a similar manner, though for such use the windings, proportions, and relations of parts should be varied to suit the different requirements.

In the drawings attached to and made part of this specification, Figure 1 is a diagram of one form of my invention. Fig. 2 is a diagrammatic view of the invention applied to an electric meter, and Figs. 3 and 4 are diagrams illustrating the relation of the currents in the different circuits.

The mains $a\ a'$ are connected to a single-phase alternator L and are adapted to supply current to a load M. As the inductance of this load changes, it is evident that the lag of the current behind the electromotive force will also change, with the result that the actual energy supplied to the load will be less than the product of the volts by the amperes. The principal object of my invention is to provide a meter whose readings shall be proportional to this actual energy.

The field-magnet structure A, which I have termed a "field-magnet system," is shown as having four poles. One pair of these poles is provided with current-coils, which should in most cases be of very low resistance, in series with the main $a$. It is obvious that it is only necessary that these coils shall carry a current corresponding to that to be measured and that various other connections may be made which will accomplish the same object. The second pair of poles is provided with potential-coils K, included in a circuit in shunt to the mains. These coils are of comparatively low resistance and are connected in series with a reactance-coil D. By properly adjusting the resistance and reactance of this branch circuit any desired lag less than ninety degrees may be, in theory at least, attained. In practice it has been found that the best results are attained when this lag is very large; but it is in general impracticable for various reasons, which need not here be discussed, to make it much greater than eighty degrees.

The poles which are provided with the potential-winding are slotted across their faces, and that part of each pole which is in the direction of the revolution is provided with a short-circuited potential-coil or copper ring C, which causes the magnetism of one portion of the pole to lag behind that of the other and produces the third dephased flux, which acts inductively on the armature. The current in the short-circuited coils lags behind the current in the shunt-coils by an amount which varies with the resistance, &c., of the short-circuited coils and can be regulated by varying the design.

The magnetic flux passing through the short-circuited coil may, for illustration, be made or assumed to lag behind the flux in the other half of the pole by, say, twenty degrees. When the load on the circuit is non-inductive, the phase relation between the three magnetic fluxes acting on the armature will thus be zero, eighty degrees, and one hundred degrees. If the load on the circuit is inductive, so that the lag of the current behind the electromotive force is $z$ degrees, this phase relation will be $z$ degrees, eighty degrees, and one hundred degrees. It is evident that this result may be attained in other ways, and I do not limit myself to the particular method shown, though I have described that form which I find most efficient in practice.

The armature may be varied in many ways; but I have shown it as a simple cylinder of conducting material B, mounted so as to revolve on the shaft E. The two potential-coils give together a shifting or rotary field which acts upon the armature to produce a torque just sufficient to compensate for the friction, but not sufficient alone to start the armature. These two fluxes, acting in conjunction with the flux of the current-coil, serve also to produce a second torque which is proportional, other things being equal, to the product of the current by the voltage, but which decreases as the angle $z$ increases. The result is that the indications of the meter are proportional to the energy consumed at all loads whatever may be the angle of lag of the current.

The torque which compensates for friction may be increased or decreased by proper adjustment of the shunt and short-circuited coils.

Fig. 3 is a diagram illustrating the relation which the magnetic fluxes in the system bear to each other. At $i$ is indicated the magnetism produced by the current in the series coil, which varies in magnitude and phase with the amount and character of the load. At $j$ is indicated the magnetism produced by the potential or shunt circuit, which is shown as lagging eighty degrees behind the magnetism of the series coil. At $k$ is indicated the magnetism passing through the short-circuited or shading coil, lagging twenty degrees behind the magnetism of the shunt-coil.

As the coils K and C bear a fixed relation to each other, the angle of the lag between their currents remains constant. The current in the series coil is advanced or retarded with respect to the currents in the coils K and C as the load changes; but an unsymmetrical three-phase relation is always maintained between the currents and between the resulting fluxes.

Since the density of the resulting flux is under some circumstances reduced by the demagnetizing action of the short-circuited coil, this coil may in such a case either be made to surround more than half of the pole-face, so as to get the same total magnetic flux as in the other part of the pole-face, or the resistance of this coil may be adjusted so as to make the magnetism of this shaded portion of the pole lag more behind ninety degrees than the other portion leads, so that the effect of these two fluxes together will have the proper relation to the effect of the flux due to the series coil. Fig. 4 is a diagram similar to Fig. 3, but illustrating this latter arrangement. The flux $k$ through the short-circuited coil is less in magnitude than in Fig. 3, and its phase is therefore retarded, as shown.

Fig. 2 shows a registrating device H actuated by the shaft E. To retard the rotation of the armature B, a damping device is provided, shown in the present instance as a disk I, of conducting material, mounted on the shaft E and revolving between the poles of the permanent magnets J. It is evident that any other magnetic damping device may be substituted.

I have particularly illustrated and described my invention in connection with motor-meters; but it will be obvious that not all of my claims are restricted thereto. It should be understood that my invention may be varied in many ways.

What I claim as new, and desire to secure by Letters Patent of the United States, is—

1. The herein-described method of actuating an alternating-current motor-meter, which consists in setting up or establishing a shifting field of magnetism by means of magnetomotive forces acting along three intersecting lines, one magnetomotive force being proportional to the current and the other two to the electromotive force, and subjecting an armature to the inductive action of said field.

2. The herein-described method of actuating an alternating-current motor-meter, which consists in setting up or establishing a shifting field of magnetism by means of magnetomotive forces acting along three intersecting lines, one magnetomotive force being proportional to the current, and the other two to the electromotive force, the several magnetomotive forces being so proportioned and related to each other that the resultant of the last two is displaced in phase from the first by the complement of the angle of lag, and subjecting an armature to the inductive action of said field.

3. In a wattmeter for alternating electric currents, means for producing a magnetic flux proportional to the current and varying in phase therewith, means for producing a second magnetic flux proportional to the electromotive force and lagging in phase behind the same, and means for producing an auxiliary flux along a line at an angle to said second flux and of such magnitude and phase that the resultant of the two last-mentioned fluxes will lag behind the first by the complement of the angle of lag.

4. The combination in an electric motor of a field-magnet system and means for inducing therein magnetic fluxes of three phases, one a flux due to a series coil and proportional to the current, a second flux due to a shunt potential-coil and lagging behind the electromotive force, and a third flux lagging behind said second flux and having a fixed angular relation thereto such that the resultant of the second and third fluxes is dephased by substantially the complement of the angle of lag from the flux due to the series coil.

5. The combination in a recording electric meter, of a field-magnet system acting on the armature and having a plurality of intersecting magnetic axes, means for inducing along one of said magnetic axes a flux proportional to the current and varying in phase therewith, and means for inducing along the other magnetic axes a plurality of other fluxes dependent upon the potential of the metered circuit, which lag behind the electromotive force by different amounts and act upon the armature at different points, said fluxes being so proportioned in value and phase that their joint action upon the armature will enable the meter to register the true energy consumed in an alternating-current circuit without being substantially affected by changes of phase relation.

6. In a wattmeter for alternating currents, the combination of a field-magnet system having three intersecting magnetic axes, means for producing along one of said axes a magnetic flux proportional to the current and varying in phase therewith, means for producing along another of said axes an alternating flux proportional to the electromotive force and lagging behind the same, and means for producing along the third axis an auxiliary magnetic flux also proportional to the electromotive force, of such a magnitude and phase that the joint action of the several fluxes upon the armature will enable the meter to register the true energy consumed in an alternating-current circuit without being substantially affected by changes of phase relation.

7. In a meter for alternating currents, the combination of a field-magnet system having three intersecting magnetic axes, means for producing along one of said axes a magnetic flux proportional to the current and varying in phase therewith, means for producing along another of said axes an alternating flux proportional to the electromotive force and lagging behind the same, and means for producing along the third axis an auxiliary magnetic flux also proportional to the electromotive force, and of such magnitude and phase that the joint action of the two potential fluxes upon the armature will produce a torque sufficient to overcome the static friction of the meter.

8. In a single-phase alternating-current meter, the combination of a field-magnet system having three intersecting magnetic axes, a field-coil, in which the current-phase varies as the conditions of the circuit change, producing a magnetization along one magnetic axis, a potential-coil producing a magnetization along another magnetic axis, a reactance device in series with said potential-coil for lagging the current behind the electromotive force, and a second potential-coil depending for its current upon the first potential-coil, producing a magnetization along the third magnetic axis; the two potential-coils conveying currents which differ in phase from each other, and each generating a flux which acts upon the armature at a point removed from the point at which the flux due to the other potential-coil acts upon the armature.

9. In an electric meter, the combination of a multipolar field-magnet structure having three magnetic axes, current-coils mounted upon some of the field-poles and producing a magnetization along one of said magnetic axes, potential-coils mounted upon other field-poles and producing a magnetization along another one of said magnetic axes, and other potential-coils mounted upon a portion only of the last-named field-poles or some of them, and producing a magnetization along the third magnetic axis, and an armature acted upon by the flux induced by the field-coils.

In witness whereof I have hereunto set my hand this 10th day of November, 1896.

CHARLES P. STEINMETZ.

Witnesses:
  B. B. HULL,
  C. L. HAYNES.